Figure 1:
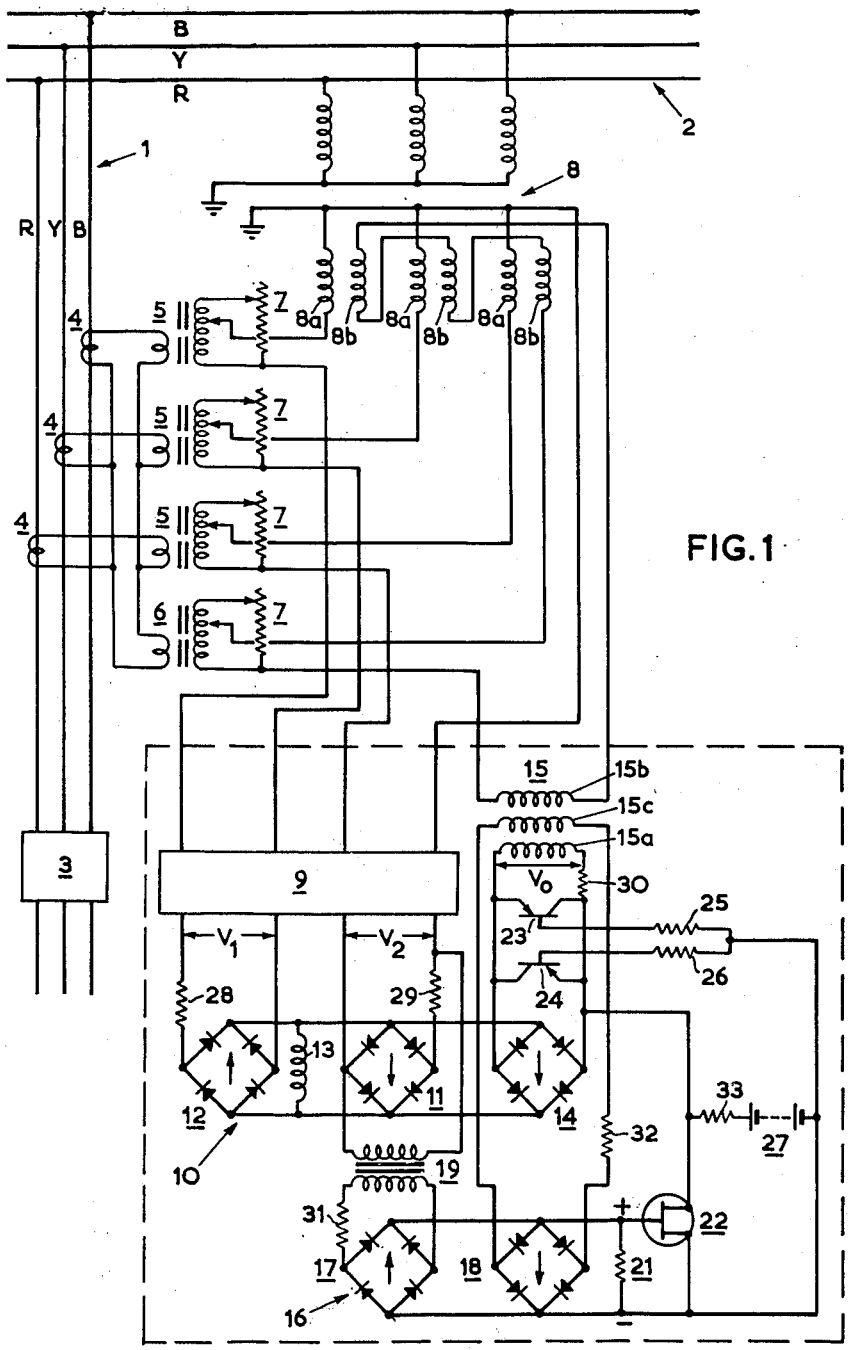

United States Patent Office 3,192,442
Patented June 29, 1965

3,192,442
ELECTRICAL PROTECTIVE RELAY SYSTEMS
Albert Russell Van Cortlandt Warrington and Eugeniusz Antoszewski, Stafford, England, assignors to The English Electric Company Limited, London, England, a British company
Filed Feb. 26, 1962, Ser. No. 175,766
Claims priority, application Great Britain, Mar. 3, 1961, 7,782/61
9 Claims. (Cl. 317—36)

This invention relates to three phase electrical protective relay systems of the so-called "distance" type.

It is an object of the invention to improve the accuracy of operation of such a relay system under certain kinds of fault conditions which may occur in an electrical circuit protected by it.

Where the expression multi-phase fault is used herein, it should be construed as excluding a balanced three-phase fault.

According to the invention an electrical distance relay system for association with one end of a section of a three phase electric power line which is to be protected by the relay system comprises first circuit means connected with the power line at the said end of the section so as to be responsive to the voltages and currents appearing at the said end of the section for producing therefrom a system of signal voltages representative of the phase to neutral voltages appearing simultaneously at the other end of the section, phase sequence component analysing means connected to the first circuit means so as to receive the said system of signal voltages for providing in response thereto voltages representative of the positive, negative, and zero phase sequence components respectively of the said signal voltage system, comparison means connected to the phase sequence component analysing means so as to be responsive to the amplitudes of the said phase sequence component voltages for comparing in response to a first control signal the positive and negative phase sequence component voltages and producing an output signal whenever the amplitude of the negative phase sequence component voltage exceeds that of the positive phase sequence component voltage, and for comparing in response to a second control signal the positive, negative, and zero phase sequence component voltages and producing an output signal whenever the sum of the amplitudes of the negative and zero phase sequence component voltages exceeds that of the positive phase sequence component voltage, discriminating means connected to the phase sequence component analysing means so as to be responsive to the phase sequence component voltages for producing the said first control signal whenever the power line is subjected to a multi-phase fault, and for producing the said second control signal whenever the power line is subjected to a single phase fault, and relay means connected to the comparison means so as to be responsive to the output signals of the comparison means for initiating in response to each such output signal a protective function for the section of the power line.

The discriminating means may comprise means connected to the phase sequence component analysing means so as to be responsive to the negative and zero phase sequence component voltages for producing the said first control signal whenever the amplitude of the zero phase sequence component voltage is equal to or less than that of the negative phase sequence component voltage, and the said second control signal whenever the amplitude of the zero phase sequence component voltage is greater than that of the negative phase sequence component voltage.

Alternatively, the discriminating means may comprise means connected to the phase sequence component analysing means so as to be responsive to the positive and negative phase sequence component voltages for producing the said first control signal whenever the amplitudes of the positive and negative phase sequence component voltages are equal, and the said second control signal whenever the amplitude of the positive phase sequence component voltage is greater than that of the negative phase sequence component voltage.

Figure 2:
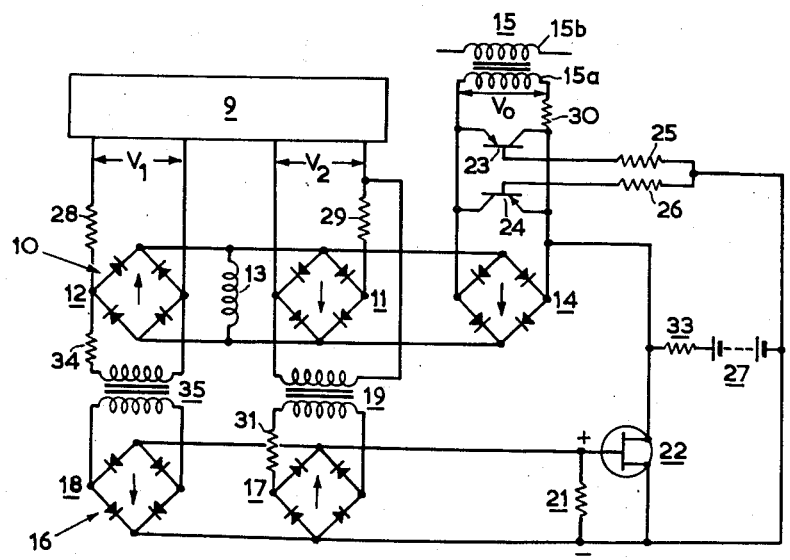

A three phase distance relay system according to the invention will now be described, by way of example, with reference to the accompanying drawings, in which FIG. 1 is a circuit diagram of one form of the system, and FIG. 2 is a circuit diagram of an alternative arrangement of the portion of the circuit of FIG. 1 bounded by the dotted lines.

Referring to FIG. 1, a three-phase line 1, a section of which is to be protected by the relay system has its lines R, Y and B connected to corresponding busbars 2 of a three phase supply. Between the busbars 2 and a circuit breaker 3, the line 1 is provided with three current transformers 4 (one in each line) whose secondary windings are star-connected and supply star connected primary windings of three transactors 5. A fourth transactor 6 has its primary winding connected between the star point of the secondary windings of the current transformers and the star point of the primary windings of the transactors 5. The secondary winding of each of the transactors 5, 6 is shunted by a variable resistor 7 and provided with tappings so that the transactors may be so adjusted as to give output signals which are at all times proportional to and in phase with the impedance drops in the conductors of the protected section of the line between the location of the current transformers 4 and the remote end of the section. In other words, the transactors 5, 6 function as facsimile impedances of the protected section of the line 1.

It should be noted that in this specification, as in others too, the term transactor is used to signify a transformer having an appreciable air gap in its magnetic core so that the transformer produces in its secondary winding an output voltage signal which is proportional to an input current flowing in its primary winding.

Signals proportional to the busbar voltages for each phase are obtained via a potential transformer 8 whose secondary windings 8a are connected in series with the output from the transactors 5 in such manner that signals proportional to the difference between the busbar voltages and the line impedance drops are obtained. The potential transformer 8 also has one tertiary winding 8b per phase and these tertiary windings are connected in series with each other and with the output from the transactor 6 in such manner as to give an output signal $V_0$ proportional to the difference between the zero phase sequence component of busbar voltage and the zero phase sequence component of the line impedance drop.

The signals proportional to the busbar voltages are, after said subtraction of the line impedance drops, fed to a phase sequence analyser network 9 to give outputs respectively proportional to the positive phase sequence component $V_1$ and the negative phase sequence component $V_2$. The signals $V_1$ and $V_2$ are supplied, through resistors 28, 29, to a comparator 10 which includes two full wave rectifier bridges 11, 12, with a sensitive polarized relay device 13 connected therebetween, the arrangement being such that the device 13 is operated when the negative phase sequence component $V_2$ exceeds the positive phase sequence component $V_1$ by a sufficient amount.

The comparator 10, further includes a rectifier bridge 14 which is so connected that its output is added to that from the bridge 11. The input to the bridge 14 is derived through a resistor 30, from a secondary winding 15a of a transformer 15 whose primary winding 15b is in series with the tertiary windings 8b of the potential transformer 8 and with the output from the transactor 6; hence the output signal $V_0$ from the bridge 14 is proportional to the zero phase sequence component of the voltage at the end of the protected section of line remote from the current transformers 4.

A further comparator 16 consists of two rectifier bridges 17 and 18. The bridge 17 is supplied with an input signal proportional to the negative phase sequence component $V_2$ via a transformer 19 and resistor 31, whilst the bridge 18 is supplied with an input signal proportional to the zero phase sequence component $V_0$ via a further secondary winding 15c on the transformer 15 and a resistor 32.

A switching device, connected to respond to the relative amplitudes of $V_2$ and $V_0$ as detected by the comparator 16, consists of a resistor 21 connected across the output from the bridge 18, a unijunction transistor 22 connected so as to be responsive to a change of polarity of the potential drop across the resistor 21, and two transistors 23, 24 connected across the transformer secondary winding 15a by their collectors and emitters. The bases of the transistors 23, 24 are connected via resistors 25, 26 to one of the two bases of the unijunction transistor 22 so as to be responsive to the latter's base to base voltage. A battery 27 supplies the requisite biasing voltage for the transistors 22, 23 and 24, through a resistor 33.

It can be shown that, at the threshold of operation of a three phase distance relay, $V_1-X_2=0$ for all multi-phase faults with or without a ground fault. For a single-phase to ground fault, on the other hand, it can be shown that the corresponding relationship is $V_1-V_2-V_0=0$.

Hence, a distance relay can have the correct reach under both the aforesaid fault conditions if provision is made for the zero phase sequence component to be included in the comparison function of the comparator 10 or excluded therefrom as required, depending on the type of fault.

It can also be shown that, for a single-phase to ground fault, $V_0$ is greater than $V_2$ whereas, for a multi-phase fault with or without a ground fault, $V_0$ is equal to or less than $V_2$.

The distance relay illustrated utilises the foregoing relationships and works as follows:

On the occurrence of a multi-phase fault, with or without a ground fault, $V_0$ is equal to or less than $V_2$ and the current circulating in the comparator 16 is such that the relative polarities of the ends of the resistor 21 are as indicated. The base-to-base voltage of the unijunction transistor 22 is such that the transistors 23 and 24 are conducting, whereby the rectifier bridge 14 is effectively short-circuited and deprived of the current which would otherwise flow in it as a result of the voltage induced in the secondary winding 15a of the transformer 15. Hence the comparison effected by the comparator 10 is only that between the positive phase sequence component $V_1$ and the negative phase sequence component $V_2$, and the threshold of operation of the sensitive polarized relay device 13 will occur when $V_1-V_2=0$.

On the occurrence of a single phase-to-ground fault, on the other hand, $V_2$ is less than $V_0$ and, by reason of a reversal in the direction of the current circulating in the comparator 16, the relative polarities of the ends of the resistor 21 are reversed; as a result the base-to-base voltage of the unijunction transistor 22 falls to nearly zero and the transistors 23 and 24 are rendered non-conducting. Thus the short-circuit across the bridge 14 is removed and a current circulates in the latter which is proportional to $V_0$. The comparator 10 thus becomes responsive to $V_0$ as well as $V_1$ and $V_2$ and, provided the bridges 11, 12 and 14 are connected so as to have the correct relative polarities, the threshold of operation of the relay device 13 is modified to the condition $V_1-V_2-V_0=0$.

The relay system illustrated will thus respond correctly to phase-to-phase, phase-to-phase and ground, and phase-to-ground faults, whereas a system responsive to $V_1-V_2$ only, would underreach by 30—40% for the single-phase to ground faults if it is calibrated so as to have the desired reach for multi-phase faults. Conversely, a system responsive to $V_1-V_2-V_0$ would overreach by as much as 100% on double ground faults if it is calibrated so as to have the desired reach for single-phase to ground faults.

It will be appreciated that, in the rare case of a balanced three phase fault, only the positive phase sequency component $V_1$ would be present; i.e., $V_2=V_0=0$. Hence the system described would not give protection against this type of fault and, as is well known, a separate single phase distance relay is required if such protection is desired.

Referring now to FIG. 2, it can also be shown that, for a single phase-to-ground fault, the $V_1$ is greater than $V_2$ whereas, for a multi-phase fault, with or without ground fault, $V_1=V_2$. The comparator 16 is arranged to utilize these relationships in that the bridge 18 is connected, through a resistor 34 and transformer 35 (in place of the winding 15c and the resistance 32 of FIG. 1), to receive a voltage proportional to the positive phase sequence component $V_1$, the bridge 17 being connected, as in FIG. 1, to receive a voltage proportional to the negative phase sequence component $V_2$. Thus the operation of the system according to FIG. 2 is the same as that shown in FIG. 1 except that the introduction of the zero phase sequence component $V_0$ into the comparator 10 by the bridge 14 this time depends not on the relative values of $V_2$ and $V_0$ but on those of $V_1$ and $V_2$.

What we claim as our invention and desire to secure by Letters Patent is:

1. An electrical distance relay system for association with one end of a section of a three phase electric power line which is to be protected by the relay system comprising first circuit means connected with the power line at the said end of the section so as to be responsive to the voltages and currents appearing at the said end of the section for producing therefrom a system of signal voltages representative of the phase to neutral voltages appearing simultaneously at the other end of the section, phase sequence component analysing means connected to the first circuit means so as to receive the said system of signal voltages for providing in response thereto voltages representative of the positive, negative, and zero phase sequence components respectively of the said signal voltage system, comparison means connected to the phase sequence component analysing means so as to be responsive to the amplitudes of the said phase sequence component voltages for comparing in response to a first control signal the positive and negative phase sequence component voltages and producing an output signal whenever the amplitude of the negative phase sequence component voltage exceeds that of the positive phase sequence component voltage, and for comparing in response to a second control signal the positive, negative, and zero phase sequence component voltages and producing an output signal whenever the sum of the amplitudes of the negative and zero phase sequence component voltages exceeds that of the positive phase sequence component voltage, discriminating means connected to the phase sequence component analysing means so as to be responsive to the phase sequence component voltages for producing the said first control signal whenever the power line is subjected to a multi-phase fault, and for producing the said second control signal whenever the power line is subjected to a single phase fault, and relay means connected to the comparison means so as to be responsive to the output signals of the comparison means for initiating in response to each such output signal a protective function for the section of the power line.

2. An electrical distance relay system according to claim 1, wherein the discriminating means comprises means connected to the phase sequence component analysing means so as to be responsive to the negative and zero phase sequence component voltages for producing the said first control signal whenever the amplitude of the zero phase sequence component voltage is equal to or less than that of the negative phase sequence component voltage, and the said second control signal whenever the amplitude of the zero phase sequence component voltage is greater than that of the negative phase sequence component voltage.

3. An electrical distance relay system according to claim 1, wherein the discriminating means comprises means connected to the phase sequence component analysing means so as to be responsive to the positive and negative phase sequence component voltages for producing the said first control signal whenever the amplitudes of the positive and negative phase sequence component voltages are equal, and the said second control signal whenever the amplitude of the positive phase sequence component voltage is greater than that of the negative phase sequence component voltage.

4. An electrical distance relay system according to claim 1, wherein the comparison means includes first, second and third similar full-wave bridge type rectifier networks, each such network having a pair of alternating current input terminals and positive and negative direct current output terminals, a first connection means for connecting the alternating current terminals of the networks to the phase sequence component analysing means so that the first, second and third rectifier networks produce at their respective output terminals direct current voltages dependent on the said positive, negative and zero phase sequence component voltages respectively, a second connection means for connecting electrically together the positive direct current output terminal of the first rectifier network and the negative direct current output terminals of the second and third rectifier networks, a third connection means for connecting electrically together the negative direct current output terminal of the first rectifier network and the positive direct current output terminals of the second and third rectifier networks, and switching means connected between the A.C. input terminals of the third rectifier network, the switching means being responsive to the said first and second control signals, and operative in response to the first control signal to connect together the A.C. input terminals of the third rectifier network, and in response to the second control signal to disconnect the A.C. input terminals of the third rectifier network from one another, the said relay means being connected between the said second and third connection means and being polarised to respond to an excess of the direct current supplied by the second and third rectifier networks over the direct current supplied by the first rectifier network.

5. An electrical distance relay system according to claim 4, wherein the switching means includes first and second transistors each having base, emitter, and collector electrodes, the emitter electrode of the first transistor and the collector electrode of the second transistor being connected with one direct current output terminal of the third rectifier network and the collector electrode of the first transistor and the emitter electrode of the second transistor being connected with the other direct current output terminal of the third rectifier network, and control means connected in circuit with the base and emitter electrodes of both of the two transistors for enabling the flow of current in the base-emitter circuits of the transistors in response to the said first control signal, and for reducing to a low value the flow of base current in the base-emitter circuits of the transistors in response to the said second control signal.

6. An electrical distance relay system according to claim 4, wherein the discriminating means includes fourth and fifth similar full-wave bridge type rectifier networks, each such network having a pair of alternating current input terminals and positive and negative direct current output terminals, a fourth connection means for connecting the alternating current terminals of the rectifier networks to the phase sequence component analysing means so that the fourth and fifth rectifier networks produce at their respective direct current output terminals direct current voltages dependent on the negative and zero phase sequence component voltages respectively, a fifth connection means for connecting together the positive direct current output terminal of the fourth rectifier network and the negative direct current output terminal of the fifth rectifier network, a sixth connection means for connecting together the negative direct current output terminal of the fourth rectifier network and the positive direct current output terminal of the fifth rectifier network, and control signal producing means connected between the said fifth and sixth connection means for energisation by a direct current which is the difference of the direct currents supplied by the fourth and fifth rectifier networks for producing the said first control signal when the direct current supplied by the fourth rectifier network exceeds that supplied by the fifth rectifier network, and the said second control signal when the direct current supplied by the fifth rectifier network exceeds that supplied by the fourth rectifier network.

7. An electrical distance relay system according to claim 4, wherein the discriminating means includes fourth and fifth similar full-wave bridge type rectifier networks, each such network having a pair of alternating current input terminals and positive and negative direct current output terminals, a fourth connection means for connecting the alternating current terminals of the rectifier networks to the phase sequence component analysing means so that the fourth and fifth rectifier networks produce at their respective direct current output terminals direct current voltages dependent on the positive and negative phase sequence component voltages respectively, a fifth connection means for connecting together the positive direct current output terminal of the fourth rectifier network and the negative direct current output terminal of the fifth rectifier network, and a sixth connection means for connecting together the negative direct current output terminal of the fourth rectifier network and the positive direct current output terminal of the fifth rectifier network, and control signal producing means connected between the fifth and sixth connection means for energisation by a direct current which is the difference of the direct currents supplied by the fourth and fifth rectifier networks for producing the said first control signal when the currents supplied by the fourth and fifth rectifier networks are equal, and the said second control signal when the current supplied by the fourth rectifier network exceeds that supplied by the fifth rectifier network.

8. An electrical distance relay system according to claim 4, wherein the said first circuit means includes a voltage transforming means connected to the power line at the said end of the section for producing a system of independent voltages representative of the normal phase to neutral voltages appearing at the said other end of the section of the supply line, current responsive means connected with the supply line at the said end of the section for producing a system of independent voltages representative of the voltage drops in the section of the power line, and summing means for vectorially combining the two systems of independent voltages to produce as the said system of signal voltages a system of voltages which represents the actual voltages appearing at the said other end of the section.

9. An electrical distance relay system according to claim 8, wherein the current responsive means includes current transforming means connected with the supply line at the said end of the section, transactor means connected for energisation by the current transforming means for producing a system of independent voltages proportional to the currents in the power line at the said end of the section, a plurality of independent impedance means connected for energisation by the respective transactor means, and output circuit means connected with the transactor means for providing the said system of independent voltages representative of the voltage drops in the section of the power line, the transactor means and their associated impedance means being adjusted so as to constitute replica impedance devices for the power line.

References Cited by the Examiner
UNITED STATES PATENTS
2,406,411   8/46   Sonnemann _____ 317—46

SAMUEL BERNSTEIN, *Primary Examiner.*